US010229323B2

(12) United States Patent
Huang

(10) Patent No.: US 10,229,323 B2
(45) Date of Patent: Mar. 12, 2019

(54) TERMINAL AND METHOD FOR MANAGING VIDEO FILE

(71) Applicant: Yulong Computer Telecommunication Scientific (Shenzhen) Co., Ltd., Shenzhen, Guangdong (CN)

(72) Inventor: Xiaodi Huang, Guangdong (CN)

(73) Assignee: YULONG COMPUTER TELECOMMUNICATIONS SCIENTIFIC (SHENZHEN) CO., LTD., Shenzhen (CN)

( * ) Notice: Subject to any disclaimer, the term of this patent is extended or adjusted under 35 U.S.C. 154(b) by 254 days.

(21) Appl. No.: 15/025,775

(22) PCT Filed: Oct. 30, 2013

(86) PCT No.: PCT/CN2013/086207
§ 371 (c)(1),
(2) Date: Mar. 29, 2016

(87) PCT Pub. No.: WO2015/061979
PCT Pub. Date: May 7, 2015

(65) Prior Publication Data
US 2016/0247025 A1    Aug. 25, 2016

(51) Int. Cl.
*G06K 9/00* (2006.01)
*G11B 27/00* (2006.01)
*G11B 27/34* (2006.01)

(52) U.S. Cl.
CPC ..... *G06K 9/00744* (2013.01); *G06K 9/00268* (2013.01); *G11B 27/005* (2013.01); *G11B 27/34* (2013.01)

(58) Field of Classification Search
CPC .......... G06K 9/00744; G06K 9/00268; G11B 27/005; G11B 27/34
See application file for complete search history.

(56) References Cited

U.S. PATENT DOCUMENTS

2004/0128317 A1* 7/2004 Sull ................... G06F 17/30849

FOREIGN PATENT DOCUMENTS

| CN | 101930779 A | 12/2010 |
|----|-------------|---------|
| CN | 102222103 A | 10/2011 |
| CN | 102549603 A | 7/2012 |

* cited by examiner

*Primary Examiner* — Mishawn N Hunter
(74) *Attorney, Agent, or Firm* — ScienBiziP, P.C.

(57) ABSTRACT

The present invention provides a terminal, comprising an image recognition unit for recognizing a specified image obtained to extract characteristic information in the specified image, a marking unit for finding frame images matched with the specified image from all frame images in a specified video file in a preset mode according to the characteristic information and marking the found frame images, and a processing unit for performing a corresponding processing operation on the frame images marked by the marking unit according to a processing command received. Accordingly, the present invention also provides a video file management method. According to the technical solution of the present invention, video pictures in which a user is interested can be automatically selected from the video file according to needs of the user, and therefore, complex operations of searching by the user are avoided and the use experience of the user is enhanced.

17 Claims, 4 Drawing Sheets

TERMINAL AND METHOD FOR MANAGING VIDEO FILE

FIELD OF THE INVENTION

The present invention relates to the technical field of terminals and specifically relates to a terminal and method for managing video file.

BACKGROUND OF THE INVENTION

In the video playing process of an existing player, a user locates video playing by dragging a progress bar with a gesture; when the gesture stays on the progress bar, a screenshot at the position will be displayed and then the video is further played. If the user wants to watch the scenes of a role in which he is interested, he needs to drag the progress bar of the player for searching by himself.

The prior art has the shortcomings that after the video is played, if the user wants to search for and watch the scenes of the role in which he is interested, he needs to stare at the screenshots of the video images carefully to check whether the interested role appears in the images while dragging the progress bar of the player, and the operations are troublesome and take time and energy; besides, an omission may occur in the searching process.

Hence, there is a need for a new technical solution to automatically select video image in which the user is interested from a video file according to needs of the user, and therefore, the complex operations of searching by the user are avoided and the use experience of the user is enhanced.

SUMMARY OF THE INVENTION

Just in view of the above-mentioned problems, the present invention provides a new technical solution to automatically select video image in which the user is interested from a video file according to needs of the user, and therefore, the complex operations of searching by the user are avoided and the use experience of the user is enhanced.

To this end, the present invention provides a terminal, comprising an image recognition unit for recognizing a specified image obtained to extract characteristic information in the specified image; a marking unit for finding frame images matched with the specified image from all frame images in a specified video file in a preset mode according to the characteristic information and marking the found frame images; and a processing unit for performing a corresponding processing operation on the frame images marked by the marking unit according to a processing command received.

In the technical solution, the frame images matched with the specified image can be found in the video file according to the characteristic information of the specified image. For instance, if the user wants to find all the scenes of a person A in which the user is interested from a video file, the user can obtain a image of the person A and the terminal will find all the images containing the person A in the video file according to the image, and therefore, the user can perform corresponding processing on the images containing the person A according to personal needs, such as directly playing all the images of the person A in order or combining the images of the person A into a video for playing or storage. Of course, the specified image comprises but not limited to a human face image, and may also be other image, such as a license plate image. The technical solution is capable of helping the user extract the interested part of the video from the video file, and therefore, the user does not need to perform excessive searching operations and the use experience of the user is enhanced.

In the above technical solution, preferably, the marking unit comprises an extraction subunit for extracting some frame images from all the frame images in the specified video file according to a preset extraction step length; a recognition subunit for recognizing the extracted some frame images to obtain the image information of the some frame images; a comparison subunit for comparing the image information with the characteristic information and marking the frame images corresponding to the image information matched with the characteristic information; and a judgment subunit for judging whether the number of frame images between two adjacent frame images of the marked frame images is equal to the preset extraction step length, and marking the frame images between the two adjacent frame images if the result of judgment is yes.

In the technical solution, as one video file contains many frame images, and if information recognition is performed in all the frame images, the processing amount of the terminal is certainly tremendous; besides, as continuous dozens of frame images or hundreds of frame images are just slightly different, some frame images can be extracted according to the preset extraction step length from all the frame images of the video file and image information recognition is performed on the extracted frame images, wherein the preset extraction step length can be set by the user according to needs; e.g., one frame image is extracted for recognition at the interval of 100 frame images, and after the recognition is completed, whether two adjacent frame images capable of being matched with the specified image are separated by 100 frame images is further judged; if the judgment result is yes, it indicates that all the frame images between the two adjacent frame images can be matched with specified image, and at this moment, the 100 frame images are simultaneously marked. In this way, not only can the accuracy of the recognition result be guaranteed, but also the processing amount of the terminal can be reduced, and the processing speed is ensured.

The matching of the frame images with the specified image is achieved by comparing the characteristic information therebetween. For example, if the specified image is a person image, its characteristic information is facial features; the terminal will recognize the facial feature information of some frame images extracted from the video file and compares the facial feature information with the facial features of the specified image, and if the result of comparison shows consistency, it indicates mutual matching therebetween. Furthermore, if the specified image is a license plate image, its characteristic information is license plate information and the terminal will recognize the license plate information in the some frame images in the video file for matching.

In the above technical solution, preferably, the processing unit comprises a recording subunit for recording attribute information corresponding to the frame images and performing corresponding processing operations on the frame images according to the attribute information, wherein the attribute information contains time information and content information.

In the technical solution, the terminal will record the attribute information, such as the time and content of the frame images, of the frame images matched with the specified image, and therefore, the operations such as the playing and synthesis of the frame images can be realized according to the attribute information.

In the above technical solution, preferably, the recording subunit is further used for determining the time points of the frame images on a time progress bar corresponding to the specified video file according to the time information; and the processing unit further comprises a display subunit for displaying the time progress bar and highlighting the time points on the time progress bar.

In the technical solution, video fragments that the user is interested in and which are found for the user will be highlighted on the time progress bar in the playing interface of the video file, and therefore, the user can directly click to view the interested parts in the video file without searching additionally, which facilitates the user's operation.

In the above technical solution, preferably, the display subunit is further used for selecting one time point from all highlighted time points according to a received selection instruction and determining a previous time point and/or a following time point adjacent to the selected time point and displaying the corresponding frame images between the selected time point and the previous time point or the selected time point and the following time point in a time order.

In the technical solution, the user can select the interested time point in the found frame images according to personal needs and can view the frame images prior to or after the time point by virtue of a forward or back option.

In the above technical solution, preferably, the processing unit further comprises a video generation subunit for obtaining all the frame images marked by the marking unit according to a received video generation instruction and recombining all the frame images into a new video file according to the attribute information corresponding to each frame image in all the frame images; and a storage subunit for storing the new video file.

In the technical solution, the user can synthesize all the interested frame images into a new video file, and the order of synthesis can be the time order of the frame images so that the user can view and store the new video file conveniently.

In the above technical solution, preferably, the image recognition unit is further used for obtaining the specified image locally and/or from the Internet according to a received image obtaining instruction.

In the technical solution, the specified image can be obtained from local images or searched from the Internet, and a broad scope of applications is provided for the user.

In the above technical solution, preferably, the terminal further comprises a control unit for controlling the image recognition unit to start or stop recognizing the obtained specified image when a function enabling or disenabling command is received.

In the technical solution, the user can set whether the image recognition function or the like is activated according to personal needs, and therefore, targeted necessary operations can be carried out and unnecessary operations of the terminal can be avoided.

According to another aspect, the present invention also provides a video file management method, comprising step 202 of recognizing a specified image obtained to extract characteristic information in the specified image; step 204 of finding frame images matched with the specified image from all frame images in a specified video file in a preset mode according to the characteristic information and marking the found frame images; and step 206 of performing a corresponding processing operation on the marked frame images according to a processing command received.

In the technical solution, the frame images matched with the specified image can be found in the video file according to the characteristic information of the specified image. For instance, if the user wants to find all the scenes of a person A in which the user is interested from a video file, the user can obtain a image of the person A and the terminal will find all the images containing the person A in the video file according to the image, and therefore, the user can perform corresponding processing on the images containing the person A according to personal needs, such as directly playing all the images of the person A in order or combining the images of the person A into a video for playing or storage. Of course, the specified image comprises but not limited to a human face image, and may also be other image, such as a license plate image. The technical solution is capable of helping the user extract the interested part of the video from the video file, and therefore, the user does not need to perform excessive searching operations and the use experience of the user is enhanced.

In the technical solution, preferably, the step 204 comprises: extracting some frame images from all the frame images in the specified video file according to a preset extraction step length; recognizing the extracted some frame images to obtain the image information of the some frame images; comparing the image information with the characteristic information and marking the frame images corresponding to the image information matched with the characteristic information; and judging whether the number of frame images between two adjacent frame images of the marked frame images is equal to the preset extraction step length and marking the frame images between the two adjacent frame images if the result of judgment is yes.

In the technical solution, as one video file contains many frame images, and if information recognition is performed on all the frame images, the processing amount of the terminal is certainly tremendous; besides, as continuous dozens of frame images or hundreds of frame images are just slightly different, some frame images can be extracted according to the preset extraction step length from all the frame images of the video file and image information recognition is performed on the extracted frame images, wherein the preset extraction step length can be set by the user according to needs; e.g., one frame image is extracted for recognition at the interval of 100 frame images, and after recognition is completed, whether two adjacent frame images capable of being matched with the specified image are separated by 100 frame images is further judged; if the judgment result is yes, it indicates that all the frame images between the two adjacent frame images can be matched with specified image, and at this moment, the 100 frame images are simultaneously marked. In this way, not only can the accuracy of the recognition result be guaranteed, but also the processing amount of the terminal can be reduced, and the processing speed is ensured.

The matching of the frame images with the specified image is achieved by comparing the characteristic information therebetween. For example, if the specified image is a person image, its characteristic information is facial features; the terminal will recognize the facial feature information of the some frame images extracted from the video file and compares the facial feature information with the facial features of the specified image, and if the result of comparison shows consistency, it indicates mutual matching therebetween. Furthermore, if the specified image is a license plate image, its characteristic information is license plate information and the terminal will recognize the license plate information in the some frame images in the video file for matching.

In the technical solution, preferably, the step 206 comprises recording attribute information corresponding to the frame images and performing corresponding processing operations on the frame images according to the attribute information, wherein the attribute information contains time information and content information.

In the technical solution, the terminal will record the attribute information, such as the time and content of the frame images, of the frame images matched with the specified image, and therefore, the operations such as the playing and synthesis of the frame images can be realized according to the attribute information.

In the technical solution, preferably, the step 206 further comprises: determining the time points of the frame images on a time progress bar corresponding to the specified video file according to the time information; and displaying the time progress bar and highlighting the time points on the time progress bar.

In the technical solution, video fragments that the user is interested in and which are found for the user will be highlighted on the time progress bar in the playing interface of the video file, and therefore, the user can directly click to view the interested parts in the video file without searching additionally, which facilitate the user's operation.

In the technical solution, preferably, the step 206 further comprises selecting one time point from all highlighted time points according to a received selection instruction and determining a previous time point and/or a following time point adjacent to the selected time point and displaying the corresponding frame images between the selected time point and the previous time point or the selected time point and the following time point in a time order.

In the technical solution, the user can select the interested time point in the found frame images according to personal needs and can view the frame images prior to or after the time point by virtue of a forward or back option.

In the technical solution, preferably, the step 206 further comprises: obtaining all the marked frame images according to a received video generation instruction and recombining all the frame images into a new video file according to the attribute information corresponding to each frame image in all the frame images; and storing the new video file.

In the technical solution, the user can synthesize all the interested frame images into a new video file, and the order of synthesis can be the time order of the frame images so that the user can view and store the new video file conveniently.

In the technical solution, preferably, the video file management method further comprises: obtaining the specified image locally and/or from the Internet according to a received image obtaining instruction.

In the technical solution, the specified image can be obtained from local images or searched from the Internet, and a broad scope of applications is provided for the user.

In the technical solution, preferably, the video file management method further comprises: starting or stopping recognizing the obtained specified image when a function enabling or disenabling command is received.

In the technical solution, the user can set whether the image recognition function or the like is activated according to personal needs, and therefore, targeted necessary operations can be carried out and unnecessary operations of the terminal can be avoided.

According to an embodiment of the present invention, further provided is a program product stored in a nonvolatile machine readable media and used for video file management. The program product comprises machine executable instructions enabling a computer system to perform the following steps: recognizing a specified image obtained to extract characteristic information in the specified image; finding frame images matched with the specified image from all frame images in a specified video file in a preset mode according to the characteristic information and marking the found frame images; and performing a corresponding processing operation on the marked frame images according to a processing command received.

According to an embodiment of the present invention, further provided is a nonvolatile machine readable media in which the program product for video file management is stored, wherein the program product comprises the machine executable instructions enabling a computer system to perform the following steps: recognizing a specified image obtained to extract characteristic information in the specified image; finding frame images matched with the specified image from all frame images in a specified video file in a preset mode according to the characteristic information and marking the found frame images; and performing a corresponding processing operation on the marked frame images according to a processing command received.

According to an embodiment of the present invention, further provided is a machine readable program enabling a machine to implement the video file management method in any above-mentioned technical solution.

According to an embodiment of the present invention, further provided is a storage media in which the machine readable program is stored, wherein the machine readable program enables the machine to implement the video file management method in any above-mentioned technical solution.

According to the foregoing technical solutions, the problem that the user needs to drag the time program bar to find the interested video images is solved, the consumption of time and energy of the user is avoided and the use experience of the user is enhanced.

DETAILED DESCRIPTION OF THE EMBODIMENTS

In order to understand the objects, features and advantages of the present invention more clearly, the attributes of the present invention are further described below in combination with the accompanying drawings and specific embodiments. It should be noted that the embodiments in the application and the features in the embodiments can be combined with each other without conflict.

Many specific details are described in the description below to fully understand the present invention, but the present invention may also be implemented in other ways different from the description herein; hence, the protection scope of the present invention is not limited by the specific embodiments disclosed below.

Figure 1:
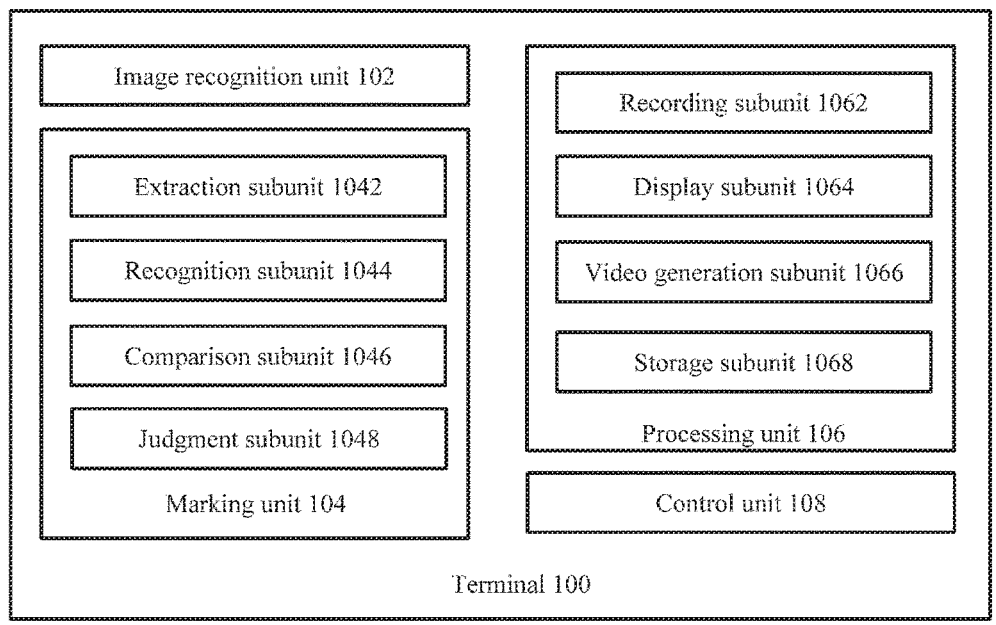
FIG. 1 shows a block diagram of a terminal according to an embodiment of the present invention.

FIG. 1 shows a block diagram of a terminal according to an embodiment of the present invention.

As shown in FIG. 1, the terminal 100 according to the embodiment of the present invention comprises an image recognition unit 102 for recognizing a specified image obtained to extract characteristic information in the specified image; a marking unit 104 for finding frame images matched with the specified image from all frame images in a specified video file in a preset mode according to the characteristic information and marking the found frame images; and a processing unit 106 for performing a corresponding processing operation on the frame images marked by the marking unit according to a processing command received.

In the technical solution, the frame images matched with the specified image can be found in the video file according to the characteristic information of the specified image. For instance, if the user wants to find all the scenes of a person A in which the user is interested from a video file, the user can obtain a image of the person A and the terminal will find all the images containing the person A in the video file according to the image, and therefore, the user can perform corresponding processing on the images containing the person A according to personal needs, such as directly playing all the images of the person A in order or combining the images of the person A into a video for playing or storage. Of course, the specified image comprises but not limited to a human face image, and may also be other image, such as a license plate image. The technical solution is capable of helping the user extract the interested part of the video from the video tile, and therefore, the user does not need to perform excessive searching operations and the use experience of the user is enhanced.

In the technical solution, preferably, the marking unit 104 comprises an extraction subunit 1042 for extracting some frame images from all the frame images in the specified video file according to a preset extraction step length; a recognition subunit 1044 for recognizing the extracted some frame images to obtain the image information of the some frame images; a comparison subunit 1046 for comparing the image information with the characteristic information and marking the frame images corresponding to the image information matched with the characteristic information; and a judgment subunit 1048 for judging whether the number of frame images between two adjacent frame images of the marked frame images is equal to the preset extraction step length, and marking the frame images between the two adjacent frame images if the result of judgment is yes.

In the technical solution, as one video file contains many frame images, and if information recognition is performed on all the frame images, the processing amount of the terminal is certainly tremendous; besides, as continuous dozens of frame images or hundreds of frame images are just slightly different, some frame images can be extracted according to the preset extraction step length from all the frame images of the video file and image information recognition is performed on the extracted frame images, wherein the preset extraction step length can be set by the user according to needs; e.g., one frame image is extracted for recognition at the interval of 100 frame images, and after recognition is completed, whether two adjacent frame images capable of being matched with the specified image are separated by 100 frame images is further judged; if the judgment result is yes, it indicates that all the frame images between the two adjacent frame images can be matched with specified image, and at this moment, the 100 frame images are simultaneously marked. In this way, not only can the accuracy of the recognition result be guaranteed, but also the processing amount of the terminal can be reduced, and the processing speed is ensured.

The matching of the frame images with the specified image is achieved by comparing the characteristic information therebetween. For example, if the specified image is a person image, its characteristic information is facial features; the terminal will recognize the facial feature information of the some frame images extracted from the video file and compares the facial feature information with the facial features of the specified image, and if the result of comparison shows consistency, it indicates mutual matching therebetween. Furthermore, if the specified image is a license plate image, its characteristic information is license plate information and the terminal will recognize the license plate information in the some frame images in the video file for matching.

In the technical solution, preferably, the processing unit 106 comprises: a recording subunit 1062 for recording attribute information corresponding to the frame images and performing corresponding processing operations on the frame images according to the attribute information, wherein the attribute information contains time information and content information.

In the technical solution, the terminal will record the attribute information, such as the time and content of the frame images, of the frame images matched with the specified image, and therefore, the operations such as the playing and synthesis of the frame images can be realized according to the attribute information.

In the technical solution, preferably, the recording subunit 1062 is further used for determining the time points of the frame images on a time progress bar corresponding to the specified video file according to the time information; and the processing unit 106 further comprises a display subunit 1064 for displaying the time progress bar and highlighting the time points on the time progress bar.

In the technical solution, video fragments that the user is interested in and which are found for the user will be highlighted on the time progress bar in the playing interface of the video file, and therefore, the user can directly click to view the interested parts in the video file without searching additionally, which facilitate the user's operation.

In the technical solution, preferably, the display subunit 1064 is further used for selecting one time point from all highlighted time points according to a received selection instruction and determining a previous time point and/or a following time point adjacent to the selected time point and displaying the corresponding frame images between the selected time point and the previous time point or the selected time point and the following time point in a time order.

In the technical solution, the user can select the interested time point in the found frame images according to personal needs and can view the frame images prior to or after the time point by virtue of a forward or back option.

In the technical solution, preferably, the processing unit 106 further comprises a video generation subunit 1066 for obtaining all the frame images marked by the marking unit according to a received video generation instruction and recombining all the frame images into a new video file according to the attribute information corresponding to each frame image in all the frame images; and a storage subunit 1068 for storing the new video file.

In the technical solution, the user can synthesize all the interested frame images into a new video file, and the order of synthesis can be the time order of the frame images so that the user can view and store the new video file conveniently.

In the technical solution, preferably, the image recognition unit 102 is further used for obtaining the specified image locally and/or from the Internet according to a received image obtaining instruction.

In the technical solution, the specified image can be obtained from local images or searched from the Internet, and a broad scope of applications is provided for the user.

In the technical solution, preferably, the terminal further comprises a control unit 108 for controlling the image recognition unit to start or stop recognizing the obtained specified image when a function enabling or disenabling command is received.

In the technical solution, the user can set whether the image recognition function or the like is activated according to personal needs, and therefore, targeted necessary operations can be carried out and unnecessary operations of the terminal can be avoided.

Figure 2:
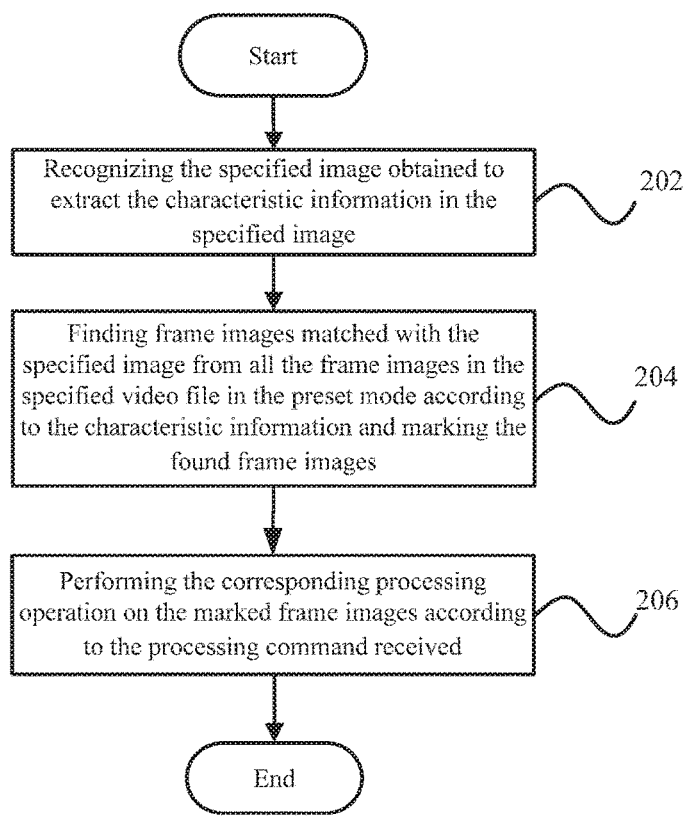
FIG. 2 shows a flow diagram of a video file management method according to an embodiment of the present invention.

FIG. 2 shows a flow diagram of a video file management method according to an embodiment of the present invention.

As shown in FIG. 2, the video file management method according to the embodiment of the present invention comprises step 202 of recognizing a specified image obtained to extract characteristic information in the specified image; step 204 of finding frame images matched with the specified image from all frame images in a specified video file in a preset mode according to the characteristic information and marking the found frame images; and step 206 of performing a corresponding processing operation on the marked frame images according to a processing command received.

In the technical solution, the frame images matched with the specified image can be found in the video file according to the characteristic information of the specified image. For instance, if the user wants to find all the scenes of a person A in which the user is interested from a video file, the user can obtain a image of the person A and the terminal will find all the images containing the person A in the video file according to the image, and therefore, the user can perform corresponding processing on the images containing the person A according to personal needs, such as directly playing all the images of the person A in order or combining the images of the person A into a video for playing or storage. Of course, the specified image comprises but not limited to a human face image, and may also be other image, such as a license plate image. The technical solution is capable of helping the user extract the interested part of the video from the video file, and therefore, the user does not need to perform excessive searching operations and the use experience of the user is enhanced.

In the technical solution, preferably, the step 204 comprises extracting some frame images from all the frame images in the specified video file according to a preset extraction step length; recognizing the extracted some frame images to obtain the image information of the some frame images; comparing the image information with the characteristic information and marking the frame images corresponding to the image information matched with the characteristic information; and judging whether the number of frame images between two adjacent frame images of the marked frame images is equal to the preset extraction step length and marking the frame images between the two adjacent frame images if the result of judgment is yes.

In the technical solution, as one video file contains many frame images, and if information recognition is performed on all the frame images, the processing amount of the terminal is certainly tremendous; besides, as continuous dozens of frame images or hundreds of frame images are just slightly different, some frame images can be extracted according to the preset extraction step length from all the frame images of the video file and image information recognition is performed on the extracted frame images, wherein the preset extraction step length can be set by the user according to needs; e.g., one frame image is extracted for recognition at the interval of 100 frame images, and after recognition is completed, whether two adjacent frame images capable of being matched with the specified image are separated by 100 frame images is further judged; if the judgment result is yes, it indicates that all the frame images between the two adjacent frame images can be matched with specified image, and at this moment, the 100 frame images are simultaneously marked. In this way, not only can the accuracy of the recognition result be guaranteed, but also the processing amount of the terminal can be reduced, and the processing speed is ensured.

The matching of the frame images with the specified image is achieved by comparing the characteristic information therebetween. For example, if the specified image is a person image, its characteristic information is facial features; the terminal will recognize the facial feature information of the some frame images extracted from the video file and compares the facial feature information with the facial features of the specified image, and if the result of comparison shows consistency, it indicates mutual matching therebetween. Furthermore, if the specified image is a license plate image, its characteristic information is license plate information and the terminal will recognize the license plate information in the some frame images in the video file for matching.

In the technical solution, preferably, the step 206 comprises recording attribute information corresponding to the frame images and performing corresponding processing operations on the frame images according to the attribute information, wherein the attribute information contains time information and content information.

In the technical solution, the terminal will record the attribute information, such as the time and content of the frame images, of the frame images matched with the specified image, and therefore, the operations such as the playing and synthesis of the frame images can be realized according to the attribute information.

In the technical solution, preferably, the step 206 further comprises determining the time points of the frame images on a time progress bar corresponding to the specified video file according to the time information; and displaying the time progress bar and highlighting the time points on the time progress bar.

In the technical solution, video fragments that the user is interested in and which are found for the user will be highlighted on the time progress bar in the playing interface of the video file, and therefore, the user can directly click to view the interested parts in the video file without searching additionally, which facilitate the user's operation.

In the technical solution, preferably, the step 206 further comprises selecting one time point from all highlighted time points according to a received selection instruction and determining a previous time point and/or a following time point adjacent to the selected time point and displaying the corresponding frame images between the selected time point and the previous time point or the selected time point and the following time point in a time order.

In the technical solution, the user can select the interested time point in the found frame images according to personal needs and can view the frame images prior to or after the time point by virtue of a forward or back option.

In the technical solution, preferably, the step 206 further comprises obtaining all the marked frame images according to a received video generation instruction and recombining all the frame images into a new video file according to the attribute information corresponding to each frame image in all the frame images; and storing the new video file.

In the technical solution, the user can synthesize all the interested frame images into a new video file, and the order of synthesis can be the time order of the frame images so that the user can view and store the new video file conveniently.

In the technical solution, preferably, the video file management method further comprises obtaining the specified image locally and/or from the Internet according to a received image obtaining instruction.

In the technical solution, the specified image can be obtained from local images or searched from the Internet, and a broad scope of applications is provided for the user.

In the technical solution, preferably, the video file management method further comprises starting or stopping recognizing the obtained specified image when a function enabling or disenabling command is received.

In the technical solution, the user can set whether the image recognition function or the like is activated according to personal needs, and therefore, targeted necessary operations can be carried out and unnecessary operations of the terminal can be avoided.

The technical solution of the present invention is described below in detail by taking that the specified image is the person image as an example.

Figure 3:
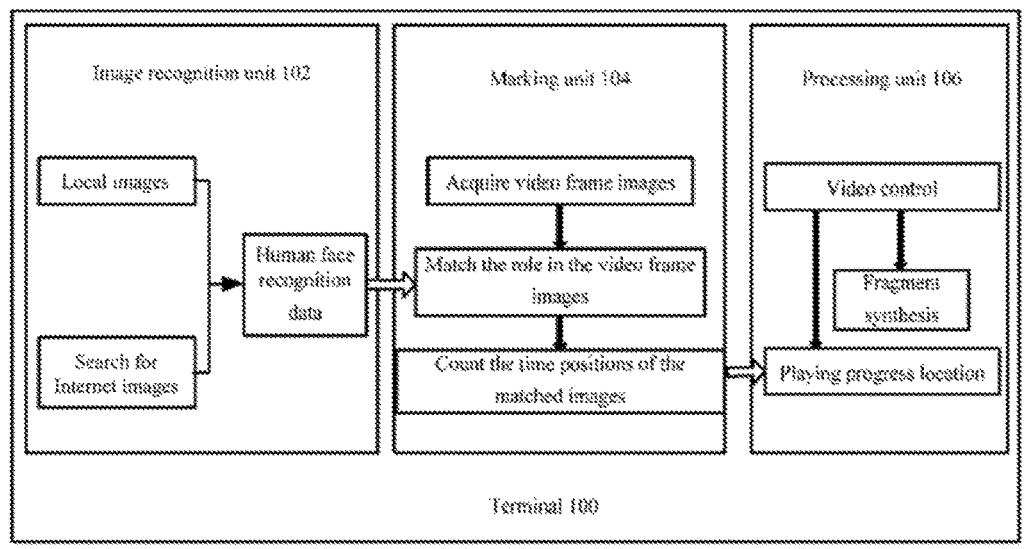
FIG. 3 shows a structural diagram of a terminal according to an embodiment of the present invention.

FIG. 3 shows a structural diagram of a terminal according to an embodiment of the present invention.

As shown in FIG. 3, the terminal 100 according to the embodiment of the present invention comprises a image acquisition unit 102, an identification unit 104 and a processing unit 106. Each part is described below in detail.

The image acquisition unit 102 is mainly used for obtaining the person image of a role in which the user is interested so as to extract human face recognition data. The source of the image data comprises that the user selects local person images or obtains the person images by searching for the name on the Internet.

The identification unit 104 is used for obtaining frame images (i.e. frame images) in a video, recognizing and matching the frame images with the human face data, finding out those frame images where the role in which the user is interested appears, and then recording the time positions of the frame images and highlighting the frame images on the progress bar of the player with a certain color.

The processing unit 106 is capable of locating the time position of a matched frame image prior to or after the current time position for continuous playing according to the current playing time position when the user clicks a forward or back control button to search for the scenes of the role. In addition, the user can select to synthesize fragments, namely synthesizing the interested fragments into a video and then saving the video.

Figure 4:
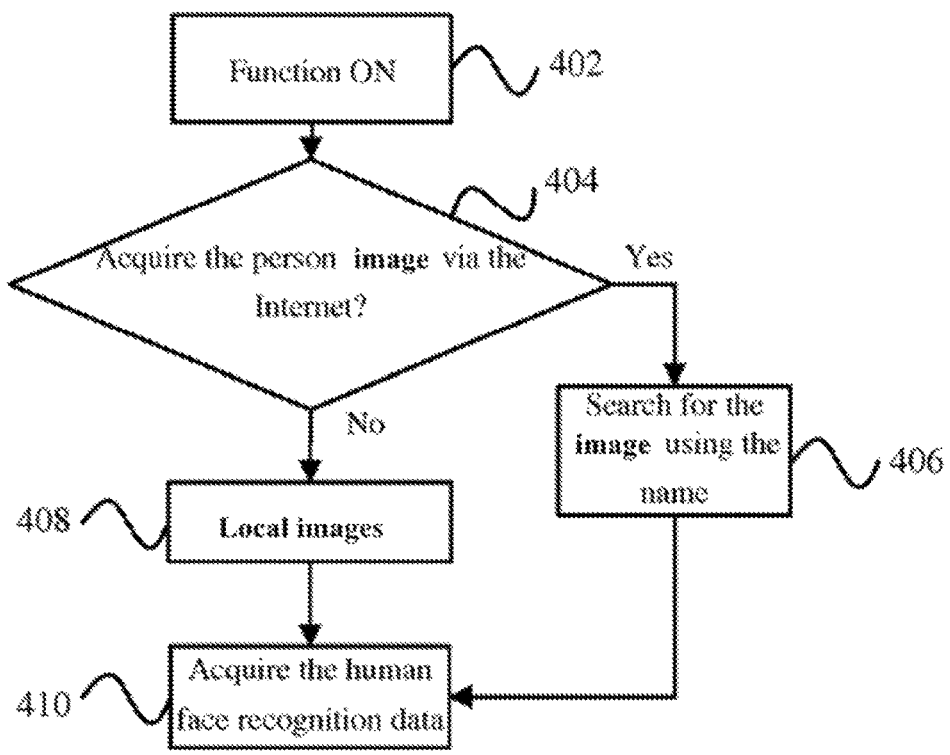
FIG. 4 shows a flow diagram of image acquisition and recognition according to an embodiment of the present invention.

FIG. 4 shows a flow diagram of image acquisition and recognition according to an embodiment of the present invention.

As shown in FIG. 4, the flow of the image recognition process according to the embodiment of the present invention is as follows:

Step 402, the terminal activates the function of recognizing the specified image, wherein the user can set whether the image recognition function or the like is activated according to personal needs, and therefore, targeted necessary operations can be carried out and unnecessary operations of the terminal can be avoided.

Step 404, the user is reminded of obtaining the person image from the Internet or not.

When the positive selection result is received, step 406 is started, and when the negative selection result is received, step 408 is started.

Step 406, the image is searched in a name searching manner or the like.

Step 408, the image is searched locally.

Step 410, the searched image is obtained and the human face recognition data in the image is acquired.

Figure 5:
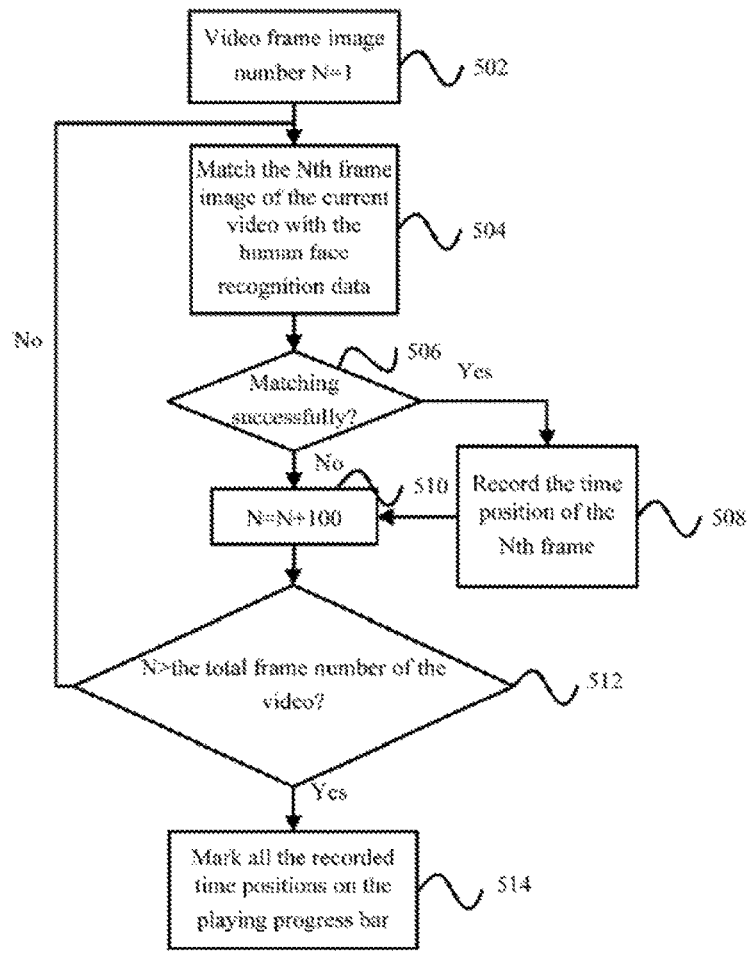
FIG. 5 shows a flow diagram of marking by the marking unit according to an embodiment of the present invention.

FIG. 5 shows a flow diagram of marking by the marking unit according to the embodiment of the present invention.

As shown in FIG. 5, the flow of the marking unit marking according to the embodiment of the present invention is as follow:

Step 502, initializing from the Nth frame image of the video, where N=1.

Step 504, matching the Nth frame image with the obtained human recognition data in the image acquisition unit.

Step 506, judging whether matching is successful, and if so, going to step 508, otherwise, going to step 510.

Step 508, recording and storing the time position of the Nth frame image.

Step 510, adding 100 to N, namely setting the preset extraction step length as 100 and extracting one frame image at the interval of 100 frame images for recognition, wherein the preset extraction step length may also be set by the user according to needs; in this way, the accuracy of the recognition result can be guaranteed, and the processing amount of the terminal can be reduced and the speed of processing can be ensured.

Step 512, judging whether N is greater than the total frame number of the whole video, and if so, going to step 514, otherwise, going to step 504, wherein if N is greater than the total frame number of the whole video, it indicates that the video is recognized completely, and at this moment, the processing operations on the video can be started.

Step 514, displaying the recorded time positions on the playing progress bar so that the user can perform video processing operations. (When the time interval between the recorded two adjacent time positions is a preset time interval, the interval between the two adjacent time positions may also be displayed correspondingly. As the preset time interval mutually corresponds to the preset extraction step length (namely 100), and If the step length between the recognized adjacent frame images is 100, it indicates that the two adjacent frame images and the 100 frame images therebetween all can be matched with the specified image; hence, their time positions also should be displayed). In this way, the video fragments that the user is interested in and which are found for the user will be highlighted on the time progress bar in the playing interface of the video file, and therefore, the user can directly click to view the interested parts in the video file without searching additionally, which facilitate the user's operation.

In addition, the user also can synthesize all the interested frame images into a new video file, and the order of synthesis can be the time order of the frame images so that the user can view and store the new video file conveniently.

The technical solution is further described below in detail in combination with FIGS. 6 and 7.

Figure 6:
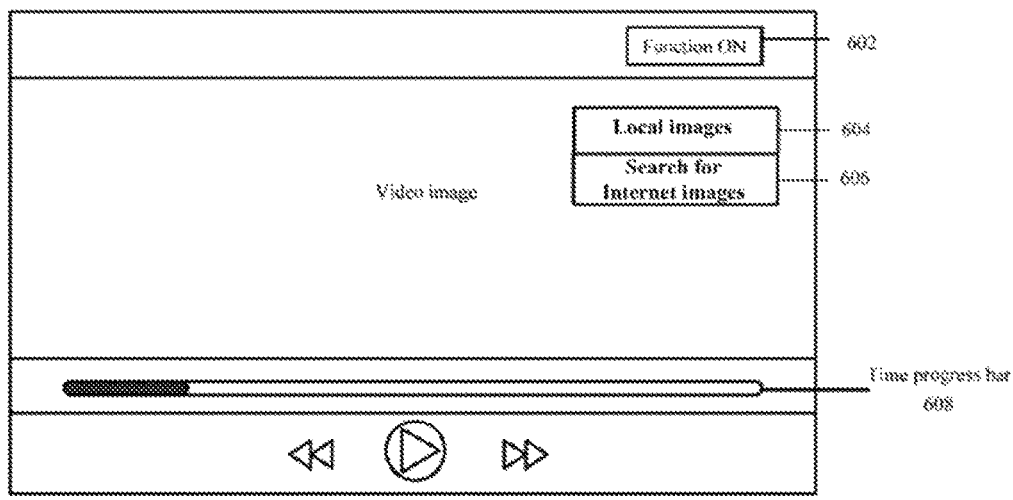
FIGS. 6 and 7 show interfacial schematic diagrams of a video file management process according to an embodiment of the present invention.
Figure 7:
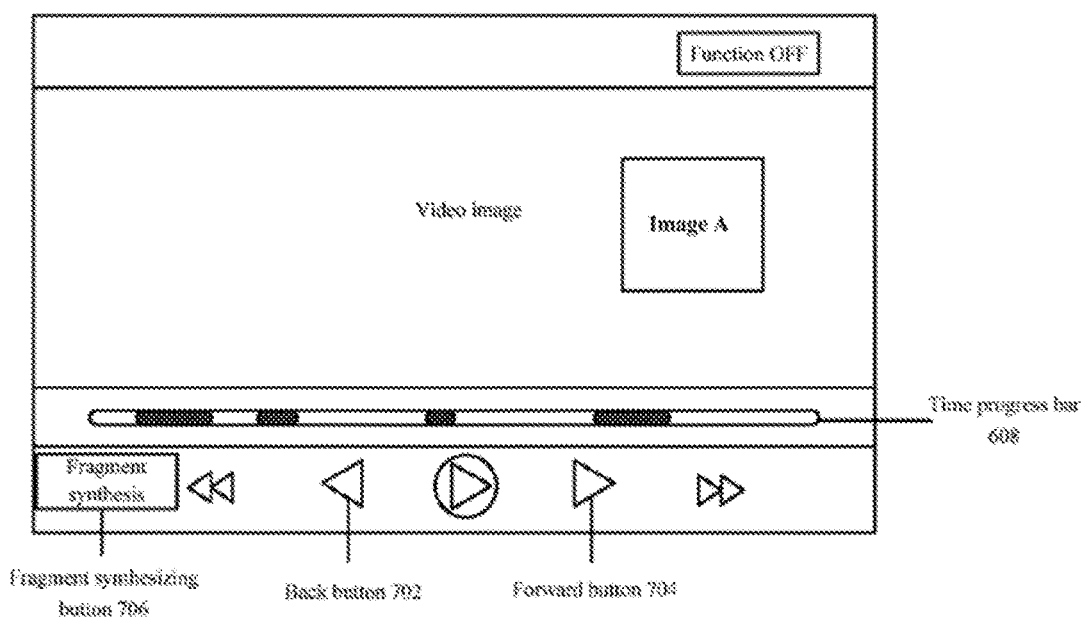

FIGS. 6 and 7 show the interfacial schematic diagrams of a video file management process according to an embodiment of the present invention.

As shown in FIG. 6, the user can click a 'function on 602' button in the video playing interface to activate the image recognition function. After the function is activated, the user can see two menus [Local Images] 604 and [Search for Internet images] 606 on the interface, and can select one menu to obtain the specified image. At this moment, the user can obtain the image of the person that the user wants to view or is interested in. For instance, the user selects the [Local Images] 604 and selects the image A from the [Local Images] 604. After obtaining the image A, the terminal obtains the characteristic information in the image A and recognizes the frame images in the current video file to find the frame images matched with the image A.

As shown in FIG. 7, after the matching is accomplished, the scenes of the role that the user is interested in are highlighted on the time progress bar 608, and two control buttons (a forward button 704 and a back button 702) and a video fragment synthesizing button (a fragment synthesizing button 706) are added. The user can select to drag the progress bar or click the forward button 704/the back button 702 to quickly locate the scenes of the interested role. When the user searches for the scenes of the role by clicking the forward button 704 or the back button 702, the terminal is capable of locating the time position of a matched frame image prior to or after the current time position for continuous playing according to the current playing time position. The fragment synthesizing button 706 facilitates the user synthesizing the interested video fragments into a video file and saving the video file.

The technical solution of the present invention is described above in detail by taking that the specific image is the person image as the example. However, the specific image in the present invention comprises but not limited to the person image, and may also be other image, such as the license plate image; besides, if the specific image is the license plate image, the terminal will identify the license plate information in some frame images in the video file for corresponding matching, and the matching and processing process is similar to the above-mentioned process, which is not described redundantly herein.

The technical solution of the present invention is described above in detail in combination with the accompanying drawings. With the technical solution of the present invention, the video images that the user is interested in can be automatically selected from the video file according to needs of the user, and therefore, the complex operations of searching by the user are avoided and the use experience of the user is enhanced.

According to an embodiment of the present invention, further provided is a program product stored in a nonvolatile machine readable media and used for video file management. The program product comprises machine executable instructions enabling a computer system to perform the following steps: recognizing a specified image obtained to extract characteristic information in the specified image; finding frame images matched with the specified image from all frame images in a specified video file in a preset mode according to the characteristic information and marking the found frame images; and performing a corresponding processing operation on the marked frame images according to a processing command received.

According to an embodiment of the present invention, further provided is a nonvolatile machine readable media in which the program product for video file management is stored, wherein the program product comprises the machine executable instructions enabling a computer system to perform the following steps: recognizing a specified image obtained to extract characteristic information in the specified image; finding frame images matched with the specified image from all frame images in a specified video file in a preset mode according to the characteristic information and marking the found frame images; and performing a corresponding processing operation on the marked frame images according to a processing command received.

According to an embodiment of the present invention, further provided is a machine readable program enabling a machine to implement the video file management method in any above-mentioned technical solution.

According to an embodiment of the present invention, further provided is a storage media in which the machine readable program is stored, wherein the machine readable program enables the machine to implement the video file management method in any above-mentioned technical solution.

Described above are merely preferred embodiments of the present invention, which are not intended to limit the present invention, and various modifications and alternations of the present invention can be made for those skilled in the art. Any modification, equivalent substitution, improvement and the like made within the spirit and principle of the present invention shall fall into the protection scope of the present invention.

The invention claimed is:

1. A terminal, comprising:
   a storage media that stores a program product, the program product comprising machine executable instructions, which enable the terminal to:
   recognize characteristic information in a specified image;
   extract frame images from all frame images in a specified video file according to a preset extraction step length, find frame images, in which image information is recognized and matched with the characteristic information in the specified image, from extracted frame images, comprising:
      recognizing the extracted frame images to obtain the image information of the extracted frame images;
      comparing the image information with the characteristic information in the specified image, and marking the frame images corresponding to the image information matched with the characteristic information; and
      judging whether a number of frame images between two adjacent frame images of the marked frame images is equal to the preset extraction step length and marking the frame images between the two adjacent frame images if the result of judgment is yes; and
   perform a corresponding processing operation on the marked frame images according to attribute information of the marked frame images, the processing operation comprising at least playing or synthesis of the marked frame images.

2. The terminal of claim 1, wherein the machine executable instructions further enable the terminal to:
   record the attribute information corresponding to the marked frame images and perform corresponding processing operations on the marked frame images according to the attribute information, the attribute information comprising time information and content information.

3. The terminal of claim 2, wherein the machine executable instructions further enable the terminal to:
determine time points of the marked frame images on a time progress bar corresponding to the specified video file according to the time information; and
display the time progress bar and highlight the time points on the time progress bar.

4. The terminal of claim 3, wherein the machine executable instructions further enable the terminal to:
select one time point from all highlighted time points according to a received selection instruction and determine a previous time point and/or a following time point adjacent to the selected time point and display corresponding frame images between the selected time point and the previous time point or the selected time point and the following time point in a time order.

5. The terminal of claim 2, wherein the machine executable instructions further enable the terminal to:
obtain all of the marked frame images according to a received video generation instruction and recombine all of the marked frame images into a new video file according to the attribute information corresponding to each of the marked frame image in all of the marked frame images; and
store the new video file.

6. The terminal of claim 1, wherein the machine executable instructions further enable the terminal to:
obtain the specified image locally and/or from the Internet according to a received image obtaining instruction.

7. The terminal of claim 1, wherein the machine executable instructions further enable the terminal to control to start or stop recognizing the obtained specified image when a function enabling or disenabling command is received.

8. The terminal of claim 1, wherein the machine executable instructions further enable the terminal to:
control to start or stop recognizing the obtained specified image when a function enabling or disenabling command is received.

9. A video file management method, comprising:
recognizing characteristic information in a specified image;
extracting frame images from all frame images in a specified video file according to a preset extraction step length, finding frame images, in which image information is recognized and matched with the characteristic information in the specified image, from extracted frame images, comprising;
recognizing the extracted frame images to obtain the image information of the extracted frame images;
comparing the image information with the characteristic information in the specified image, and marking the frame images corresponding to the image information matched with the characteristic information; and
judging whether a number of frame images between two adjacent frame images of the marked frame images is equal to the preset extraction step length and marking the frame images between the two adjacent frame images if the result of judgment is yes; and
performing a corresponding processing operation on the marked frame images according to attribute information of the marked frame images, the processing operation comprising at least playing or synthesis of the marked frame images.

10. The video file management method of claim 9, further comprising:
recording the attribute information corresponding to the marked frame images and performing corresponding processing operations on the marked frame images according to the attribute information, the attribute information comprising time information and content information.

11. The video file management method of claim 10, further comprising:
determining time points of the marked frame images on a time progress bar corresponding to the specified video file according to the time information; and
displaying the time progress bar and highlighting the time points on the time progress bar.

12. The video file management method of claim 11, further comprising:
selecting one time point from all highlighted time points according to a received selection instruction and determining a previous time point and/or a following time point adjacent to the selected time point and displaying corresponding frame images between the selected time point and the previous time point or the selected time point and the following time point in a time order.

13. The video file management method of claim 10, further comprising:
obtaining all of the marked frame images according to a received video generation instruction and recombining all of the marked frame images into a new video file according to the attribute information corresponding to each of the marked frame image in all of the marked frame images; and
storing the new video file.

14. The video file management method of claim 9, further comprising:
obtaining the specified image locally and/or from the Internet according to a received image obtaining instruction.

15. The video file management method of claim 9, further comprising:
starting or stopping recognizing the obtained specified image when a function enabling or disenabling command is received.

16. The video file management method of claim 9, further comprising:
starting or stopping recognizing the obtained specified image when a function enabling or disenabling command is received.

17. A non-transitory storage medium having stored instructions that, when executed by a terminal, causes the terminal to perform a video file management method, the video file management method comprising:
recognizing characteristic information in a specified image;
extracting frame images from all frame images in a specified video file according to a preset extraction step length, finding frame images, in which image information is recognized and matched with the characteristic information in the specified image, from extracted frame images, comprising;
recognizing the extracted frame images to obtain the image information of the extracted frame images;
comparing the image information with the characteristic information in the specified image, and marking the frame images corresponding to the image information matched with the characteristic information; and judging whether a number of frame images between two adjacent frame images of the marked frame images is equal to the preset extraction step length and marking the frame images between the two adjacent frame images if the result of judgment is yes; and performing a corresponding processing operation on the marked frame images according to attribute information of the marked frame images, the processing operation comprising at least playing or synthesis of the marked frame images.

* * * * *